United States Patent [19]

Tutherly

[11] 4,449,548

[45] May 22, 1984

[54] FLOW CONTROL DEVICE

[75] Inventor: Herbert W. Tutherly, Windsor, Conn.

[73] Assignee: United Technologies Corporation, Hartford, Conn.

[21] Appl. No.: 421,758

[22] Filed: Sep. 23, 1982

[51] Int. Cl.³ .............................................. G05D 7/01
[52] U.S. Cl. ..................................... 137/468; 137/501
[58] Field of Search ............... 137/468, 500, 501, 503, 137/504

[56] References Cited

U.S. PATENT DOCUMENTS

| 2,561,214 | 7/1951 | Matson et al. |
| 2,580,127 | 12/1951 | Renick |
| 2,601,870 | 7/1952 | Lee |
| 2,622,614 | 12/1952 | Cox ..................................... 137/500 |
| 2,704,087 | 3/1955 | Lindsay |
| 2,750,929 | 6/1956 | Bronson |
| 2,821,996 | 2/1958 | Stevenson |
| 2,870,781 | 1/1959 | Tennis |
| 2,922,400 | 1/1960 | Lorence |
| 3,006,372 | 10/1961 | Ruhl |
| 3,013,539 | 12/1961 | Rethmeier |
| 3,027,880 | 4/1962 | Van Den Bussche |
| 3,152,610 | 10/1964 | McAfee, Jr. |
| 3,198,212 | 8/1965 | Junck et al. |
| 3,262,467 | 7/1966 | Stacey |
| 3,332,436 | 7/1967 | Welty ..................................... 137/468 |
| 3,581,772 | 6/1971 | Wills |
| 3,643,685 | 2/1972 | Hays ..................................... 137/501 |
| 3,667,722 | 6/1972 | Katz et al. |
| 3,724,494 | 4/1973 | Alber ..................................... 137/501 |
| 3,881,459 | 5/1975 | Gaetcke |
| 4,004,610 | 1/1977 | Theriot |

FOREIGN PATENT DOCUMENTS 234736 9/1973 Fed. Rep. of Germany ...... 137/501

Primary Examiner—Robert G. Nilson
Attorney, Agent, or Firm—John Swiatocha

[57] ABSTRACT

A flow control device includes a housing (10) having a hollow metering valve element (55) disposed therewithin to control the effective flow area of the device. A pressure regulating valve element (70) is received within the metering valve element and maintains a relatively constant pressure drop so that a desired flow through the device may be set by a single adjustment of the position of the metering valve element.

8 Claims, 1 Drawing Figure

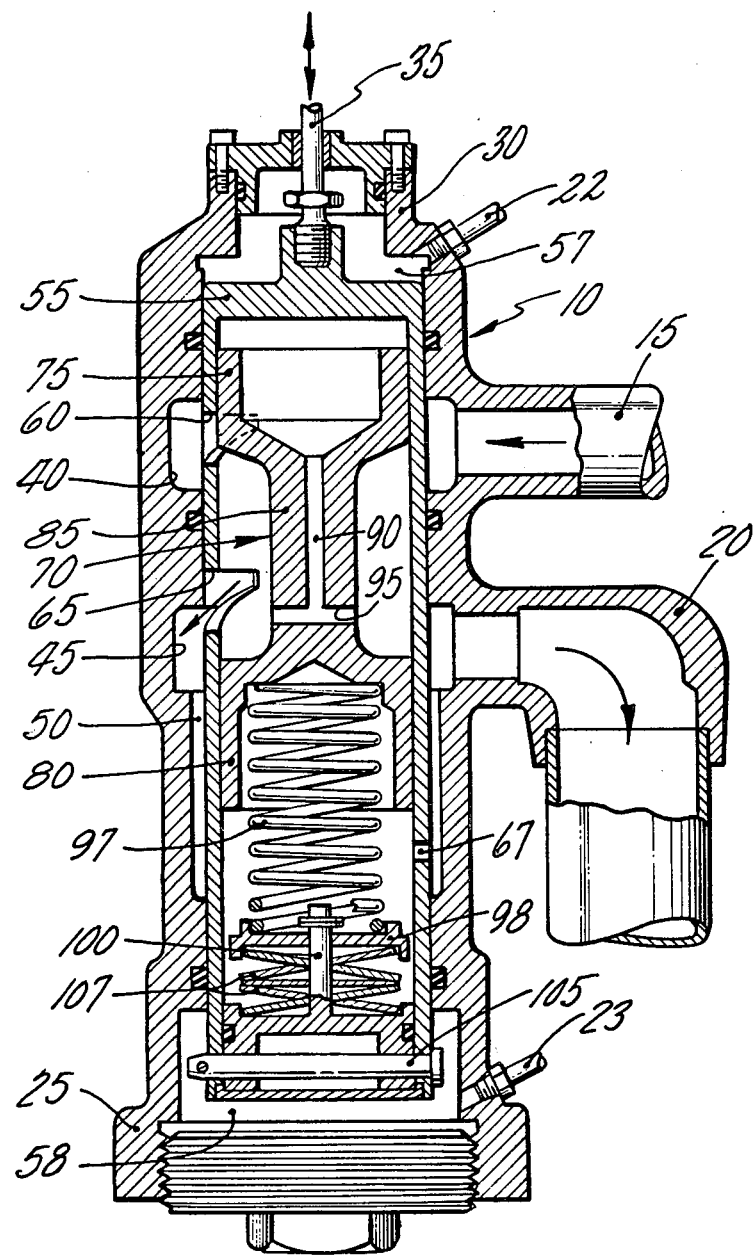

FLOW CONTROL DEVICE

CROSS REFERENCE

This invention relates to U.S. patent application Ser. Nos. 421,759 and 421,760 filed of even date herewith, and now U.S. Pat. Nos. 4,440,192, and 4,440,191, respectively.

DESCRIPTION

1. Technical Field

This invention relates in general to flow control devices and specifically to such a device which establishes a desired volumetric fluid flow rate in response to a single input thereto.

2. Background Art

It is well known that volumetric fluid flow rate through a conduit depends on both the flow area of the conduit and the pressure drop thereacross. Accordingly, in establishing a desired volumetric fluid flow rate by means of a flow control device, it is necessary to regulate not only the cross-sectional flow area of the device, but also the pressure drop thereacross. In apparatus such as hydromechanical fuel controls for gas turbine engines, it is desirable to vary engine fuel flow in response to an input to the fuel control, such input being, for example, movement of linkage or the like by a corresponding movement of pilot's power lever or similar control input device. In the past, it has been the practice to provide such hydromechanical fuel controls with a throttle (metering) valve and a pressure regulating valve, each housed separately in its own casing. Typically, the pressure regulating valve maintains a constant pressure drop across the throttle valve so that a desired flow may be obtained by control of a single variable: flow area. Under constraints of limited space, as where the fuel control is employed in a missile or the like, it has been found that utilization of throttle and pressure regulating valves in separate casings entails an inefficient contribution to the overall volume of the control and therefore, cannot be tolerated. While it is known from U.S. Pat. No. 2,750,929 to Bronson, to combine multiple valve elements in a single housing or casing, the Bronson device, for various reasons, is not suitable for use as a flow controller in such applications as gas turbine engine fuel controls.

DISCLOSURE OF INVENTION

Therefore, among the objects of the present invention is the provision of a flow control device of enhanced compactness for maintaining any of various desired flows by means of a single input to the device.

In accordance with the present invention, a flow control device includes a housing or casing having disposed therein a selectively positionable metering (throttle) valve which in turn houses a pressure regulating valve, the metering valve controlling the flow area of the device in response to an input thereto and the pressure regulating valve maintaining a generally constant pressure drop across the metering valve without regard to the position of the metering valve or the flow through the device. In the preferred embodiment, the metering valve element comprises a generally tubular member including inlet and outlet windows therein corresponding to and communicating with fluid inlet and outlet passages in the casing. As the metering element is selectively positioned within the casing, one of the windows thereof is disposed in variable registry with a corresponding casing passage for adjusting the effective flow area therebetween. The pressure regulating valve comprises a spool type valve reciprocable within the metering valve and including a first portion in variable registry with the other window in the metering element for controlling fluid pressure across the flow control device. Two opposed ends of the pressure regulating valve element communicate with fluid pressure across the one window, a balance between the pressures at the ends of the pressure regulating valve element and the force exerted by a biasing spring maintaining the pressure drop across the registry of the one window generally constant, whereby flow through the flow control device may be selectively set by adjustment of only the position of the metering element.

BRIEF DESCRIPTION OF DRAWING

The sole FIGURE is a view in a partial cross section of the flow control device of the present invention.

BEST MODE FOR CARRYING OUT THE INVENTION AND INDUSTRIAL APPLICABILITY

Referring to the Drawing, the flow control device of the present invention comprises a housing (casing) 10 provided with inlet and outlet passages 15 and 20, respectively and hydraulic fluid ports 22 and 23. As shown, housing 10 is generally cylindrical, being closed at end 25 thereof and open at opposite end 30 to receive a feedback rod 35 therethrough, the position of rod 35 being indicative of the setting of the metering valve element. Fluid input to the flow control device from inlet passage 15 flows through an annular extension 40 of the inlet passage and is exhausted from the device through annular extension 45 of outlet passage 20. Annular extension 45 also communicates with a thin annular passage 50 by which outlet pressure is maintained at the lower end of the control device as explained in greater detail hereinafter.

Metering valve element 55 is received within casing 10 defining therewith, at the ends thereof, chambers 57 and 58. Element 55 may be positioned by selective pressurization of chambers 57 and 58 through passages 22 and 23 with fluid from a suitable source thereof (not shown). As shown, metering valve element 55 is closed at opposed ends thereof and is of generally hollow, cylindrical shape. The metering element is provided with at least one inlet window 60 in fluid communication with annular extension 40 for pressurization of the interior of metering element 55 with fluid provided through inlet conduit 15. Of course, plural inlet valve windows 60 may be employed as dictated by desired valve size and required flow capacity. A plurality of such windows would be disposed cirumferentially about the valve element in alignment with the window illustrated and in communication with annular extension 40.

Metering element 55 also includes at least one outlet window or opening 65 in fluid communication with annular extension 45 for accommodating flow exhausted from the interior of metering element 55 to outlet conduit 20 through annular extension 45. It will be understood that a plurality of outlet windows such as window 65 may be employed in circumferential alignment with the illustrated window as dictated by valve size and flow accommodation requirements.

Metering valve element 70 also includes an aperture 67 through a sidewall thereof, aperture 67 providing fluid communication between thin annular passage 50 (and outlet passage 20) and the interior of valve element 55 at the lower end thereof.

A pressure regulating valve element 70 is disposed interiorly of metering valve element 55 and is longitudinally reciprocable therewithin. Pressure regulating valve element 70 may be a spool type valve element including at the ends thereof, a pair of spaced, cup shaped lands 75 and 80 disposed at opposite ends of a reduced diameter, median portion 85. A first portion (land 75) of valve element 75 is disposed in variable registry with the inlet window(s) in metering valve element 55. Median portion 85 is bored at 90 and 95, these bores providing fluid communication between the interior of metering valve element 55 surrounding the median portion with the interior of land 70. The interior of land 80 is pressurized with fluid at outlet pressure by means of communication of the interior of the lower end of metering valve element 55 with annular extension 45, annular passage 50, and aperture 67.

Pressure regulating valve element 70 is biased upwardly by a spring 97 interposed between land 80 and spring retainer 98 which is slidably disposed on retainer guide 100 pinned to the lower portion of metering valve element 55 by pin 105. A plurality of concavo-convex bimetallic discs 107 may be disposed between retainer 98 and the base of guide 100 for adjusting the preload of spring 97 in response to the temperature of the fluid handled by the flow control device to maintain uniform performance in the face of variations in ambient temperature.

In operation, an input signal to the flow control device is, for example, provided by selected pressurization of chambers 57 and 58 through ports 22 and 23. Input to the metering valve element causes a rectilinear movement thereof and such movement of valve element 55 within housing 10 places the outlet valve window(s) in select variable registry with annular extension 45 of the outlet passage thereby modulating the effective flow area between extension 45 and the outlet windows. Thus, it is noted that pressurized fluid provided by for example, a suitable pump (not shown) enters casing 10 through conduit 15, annular extension 40, inlet window 60 in valve element 55 and along the surface of median portion 85 to outlet valve window 65. Inlet valve windows 60 are dimensioned and located so as to remain unblocked by any portion of casing 10. Thus, the effective outlet flow area of the flow control device is determined by the extent of registry of windows 65 with annular extension 45.

To accurately control fluid flow it is required to control not only flow cross-sectional area but also pressure drop. In the present invention, the pressure drop across the outlet windows 65 (the registry between windows 65 and extension 45) is maintained at a constant value by pressure regulating valve element 70 whereby flow through the device is effectively controlled by a single input, the setting of metering valve element 55.

As set forth hereinabove, a first portion (land 75) of the pressure regulating element is disposed in registry with the interior of inlet window 60. Thus, pressure at the interior of metering valve element 55 between windows 60 and 65 (and adjacent the interior of outlet windows 65) is determined by the amount of this registry or, in other words, the amount of blockage of inlet windows 60 by land 75. Fluid pressure downstream of windows 65 is essentially outlet pressure which is the output of the fluid control device desired in response to the positioning of metering valve element 55. To maintain a constant pressure drop across this window, outlet pressure is applied to the interior (end face) of land 80 through annular extension 45, annular passage 50 and opening 67 in metering valve element 55. Fluid pressure immediately upstream of outlet windows 65 is applied to the interior (end face) of land 75 through bores 90 and 95.

Accordingly, it is seen that the pressure drop across the registry of outlet windows 65 with annular extension 45 is applied to opposite ends of the pressure regulating valve element and balanced by spring 90. By way of example, assuming that a desired flow is being maintained by the flow control device and it is desired to increase that flow, the additional servo fluid is admitted to chamber 57 and servo fluid is drained from chamber 58. This increases the amount of registry (overlap) between windows 65 and annular extension 45 thereby increasing flow to outlet passage 20. Regulation of pressure is provided by pressure regulating element 70 and spring 90 which hold the pressure drop across outlet window 65 generally constant. If an adjustment in metering valve element 55 results in a pressure drop which is substantially less than that desired, the spring moves valve element 70 to increase the pressure drop. If an adjustment to metering valve element 55 results in a pressure drop substantially higher than that sought to be maintained, the pressure difference across valve element 70 moves that element against the bias of spring 90 to lower the pressure drop generally to the desired value.

While the flow control device of the present invention has been illustrated and described as having outlet pressure applied to one of the ends of the pressure regulating valve element and the pressure regulating valve adjusting the effective area of the inlet valve window, it will be understood that alternate equivalent arrangements are contemplated. Thus, it will be understood that without departing from this invention, inlet pressure may be applied to an end of the pressure regulating element while the pressure regulating element may adjust the effective area of the outlet valve window.

Accordingly, it is seen by the flow control device of the present invention, a desired flow may be set by a single input, the pressure drop across the outlet windows in valve element 55 being held relatively constant by valve element 70 and spring 90. The disposition of valve element 79 within the interior of valve element 55 provides a compact arrangement particularly advantageous in applications involving constraints in overall volume.

Having thus described the invention what is claimed:

1. A flow control device comprising a housing having fluid inlet and fluid outlet passages therein, a first valve element disposed within said housing, a second valve element disposed within said first valve element, said first and second valve elements being disposed in selective communication with said inlet and outlet passages, said flow control device being characterized by:

said first valve element comprising a metering element having inlet and outlet windows therein corresponding to, and communicating with said fluid inlet and outlet passages, respectively, said metering valve element being selectively positionable within said housing such that one of said windows is disposed in selectively variable registry with the corresponding passage for adjusting the effective flow area therebetween;

said second valve element comprising a pressure regulating element having first and second ends thereof and including a first portion in variable registry with the other of said windows in said metering element for adjusting the flow therethrough;

means providing fluid communication between said corresponding passage and said second end of said pressure regulating element;

means providing fluid communication between said one window on a side thereof opposite said corresponding passage and said first end of said pressure regulating element; and means for balancing said pressure regulating element against fluid pressure on said first and second ends thereof for establishing a registry between said other window and said first portion of said pressure regulating valve element necessary to maintain a relatively constant pressure drop across said one window.

2. The flow control device of claim 1 further characterized by said one window comprising said outlet window, said other window comprising said inlet window and said corresponding passage comprising said outlet passage.

3. The flow control device of claim 1 further characterized by:

said metering element comprising a sleeve, said pressure regulating element comprising a spool member longitudinally reciprocable within said sleeve, said spool member including first and second spaced lands, said first and second ends of said pressure regulating valve element comprising the end faces of said first and second lands, said first portion of said pressure regulating element comprising one of said lands, said pressure regulating element further comprising a reduced diameter median portion disposed between said first and second lands, said median portion being in communication with both said inlet and outlet windows in said metering element, accommodating fluid flow therebetween.

4. The flow control device of claim 3 further characterized by:

said means providing fluid communication between said one window and said first end of said pressure regulating valve comprising a fluid passage connecting the surface of said median portion with said end face of said first land.

5. The flow control device of claim 3 further characterized by said means providing fluid communication between said corresponding passage and said second end of said pressure regulating valve comprising an opening disposed in said metering valve element adjacent said second end of pressure regulating element and communicating with said second end and said corresponding passage.

6. The flow control device of claim 1 characterized by said means for balancing said pressure regulating element comprising a spring received within said flow control device and engaging said pressure regulating element, said spring biasing said pressure regulating element in a direction which provides balancing of said pressure regulating element against opposed forces exerted thereon by the difference in fluid pressure on the ends of said pressure regulating element.

7. The flow control device of claim 6 further characterized by a temperature compensating spring mount received within said flow control device in supporting relation to said spring, said spring mount varying spring preload in response to varying fluid temperature.

8. The flow control device of claim 7 wherein said temperature compensating spring mount comprises a plurality of cooperating bimetallic members.

* * * * *